US011150722B1

(12) United States Patent
Ichapurapu et al.

(10) Patent No.: US 11,150,722 B1
(45) Date of Patent: *Oct. 19, 2021

(54) MITIGATING THERMAL INCREASES IN ELECTRONIC DEVICES

(71) Applicant: Amazon Technologies, Inc., Seattle, WA (US)

(72) Inventors: Ravi Ichapurapu, Morgan Hill, CA (US); Sameet Ramakrishnan, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,845

(22) Filed: Jun. 22, 2020

Related U.S. Application Data

(63) Continuation of application No. 15/980,393, filed on May 15, 2018, now Pat. No. 10,725,531.

(51) Int. Cl.
*G06F 1/3287* (2019.01)
*G06F 1/3206* (2019.01)
*H04N 21/443* (2011.01)

(52) U.S. Cl.
CPC .......... *G06F 1/3287* (2013.01); *G06F 1/3206* (2013.01); *H04N 21/4436* (2013.01)

(58) Field of Classification Search
CPC .... G06F 1/3287; G06F 1/3206; G06F 1/3203; H04N 21/40; H04N 21/41; H04N 21/43–4438
See application file for complete search history.

(56) References Cited

U.S. PATENT DOCUMENTS

| | | |
|---|---|---|
| 8,686,610 B2 | 4/2014 | Okamoto et al. |
| 9,612,880 B1 | 4/2017 | Hedley et al. |
| 9,621,989 B1 | 4/2017 | Garner et al. |
| 9,989,980 B1 | 6/2018 | Urban et al. |
| 10,050,949 B2 | 8/2018 | Marcy et al. |
| 10,178,578 B1 | 1/2019 | McFarland et al. |
| 10,356,142 B1 | 7/2019 | Rajagopalan et al. |
| 10,379,584 B2 | 8/2019 | McFarland et al. |

(Continued)

OTHER PUBLICATIONS

David Chan, et al. "Evaluating Online Ad Campaigns in a Pipeline: Causal Models At Scale" Jul. 2010; 9 pgs.
Rubin, D. et al. "Estimating the Causal Effects of Marketing Interventions Using Propensity Score Methodology." Statistical Science, Sep. 7, 2006, vol. 21, No. 2 pp. 206-222; 17 pgs.

(Continued)

*Primary Examiner* — Brian T Misiura
(74) *Attorney, Agent, or Firm* — Eversheds Sutherland (US) LLP

(57) ABSTRACT

Systems, methods, and computer-readable media are disclosed for mitigating thermal increases in electronic devices. Example devices may include memory and at least one processor configured to access the memory and execute computer-executable instructions to determine that a temperature of the device satisfies a first threshold, send a notification to an access point communicatively coupled to the device indicating that the device will enter a sleep state for a length of time, and cause the device to enter the sleep state. Certain embodiments may be configured to cause the device to enter an awake state after the length of time, determine that the temperature satisfies a second threshold, and determine that a period of time has elapsed. Some embodiments may be configured to determine that a first bandwidth mode is active at the device, and cause a second bandwidth mode to be activated at the device.

20 Claims, 7 Drawing Sheets

(56) References Cited

U.S. PATENT DOCUMENTS

| | | |
|---|---|---|
| 10,417,054 B2 | 9/2019 | Andrus et al. |
| 10,725,531 B1 | 7/2020 | Ichapurapu et al. |
| 2006/0004628 A1 | 1/2006 | Axe et al. |
| 2006/0212350 A1 | 9/2006 | Ellis et al. |
| 2007/0179849 A1 | 8/2007 | Jain |
| 2009/0228338 A1 | 9/2009 | Brandman et al. |
| 2012/0084146 A1 | 4/2012 | Zwicky |
| 2012/0089455 A1 | 4/2012 | Belani et al. |
| 2013/0091007 A1 | 4/2013 | Bae et al. |
| 2014/0040008 A1 | 2/2014 | Belani et al. |
| 2017/0041881 A1 | 2/2017 | Won et al. |
| 2018/0109566 A1 | 4/2018 | Parikh et al. |
| 2019/0171259 A1 | 6/2019 | McFarland et al. |

OTHER PUBLICATIONS

Fulgoni, G., et al. "Flow Online Advertising Works: Whither the Click?" Empirical Generalizations in Advertising Conference for Industry and Academia, Dec. 2008; The Warton School (Philadelphia, PA); 16 pgs.

McCaffrey, D., et al. "Propensity Score Estimation with Boosted Regression for Evalulating Causal Effects in Observational Studies." 41 pgs.

Rosenbaum, P., et al. "Reducting Bias in Observational Studies Using Subclassification on the Propensity Score," Journal of the American Statistical Association, Sep. 1984, vol. 79, No. 387, pp. 516-524.

Rosenbaum, P., et al. "The Central Role of the Propensity Score in Observational Studies for Causal Effects." Biometrika, 1983, vol. 70, No. 1; pp. 41-55.

Lunceford, J. et al. "Stratification and Weighting via the Propensity Score in Estimation of Causal Treatment Effects: A Comparative Study." Department of Statistics, North Carolina State University (Raleigh, NC); 32 pgs.

US 11,150,722 B1

MITIGATING THERMAL INCREASES IN ELECTRONIC DEVICES

CROSS-REFERENCE TO RELATED APPLICATION

This application is a continuation of U.S. application Ser. No. 15/980,393, filed May 15, 2018, which is incorporated by reference in its entirety.

BACKGROUND

Electronic devices may generate heat during use. For example, heat may be generated by computer processors, wireless communication components, batteries, and other components of some electronic devices. For some electronic devices, such as those with relatively small form factors, heat that is generated can quickly increase the overall temperature of the device, which may negatively impact device performance and/or a user experience with the device. Accordingly, mitigation of thermal increases in electronic devices may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
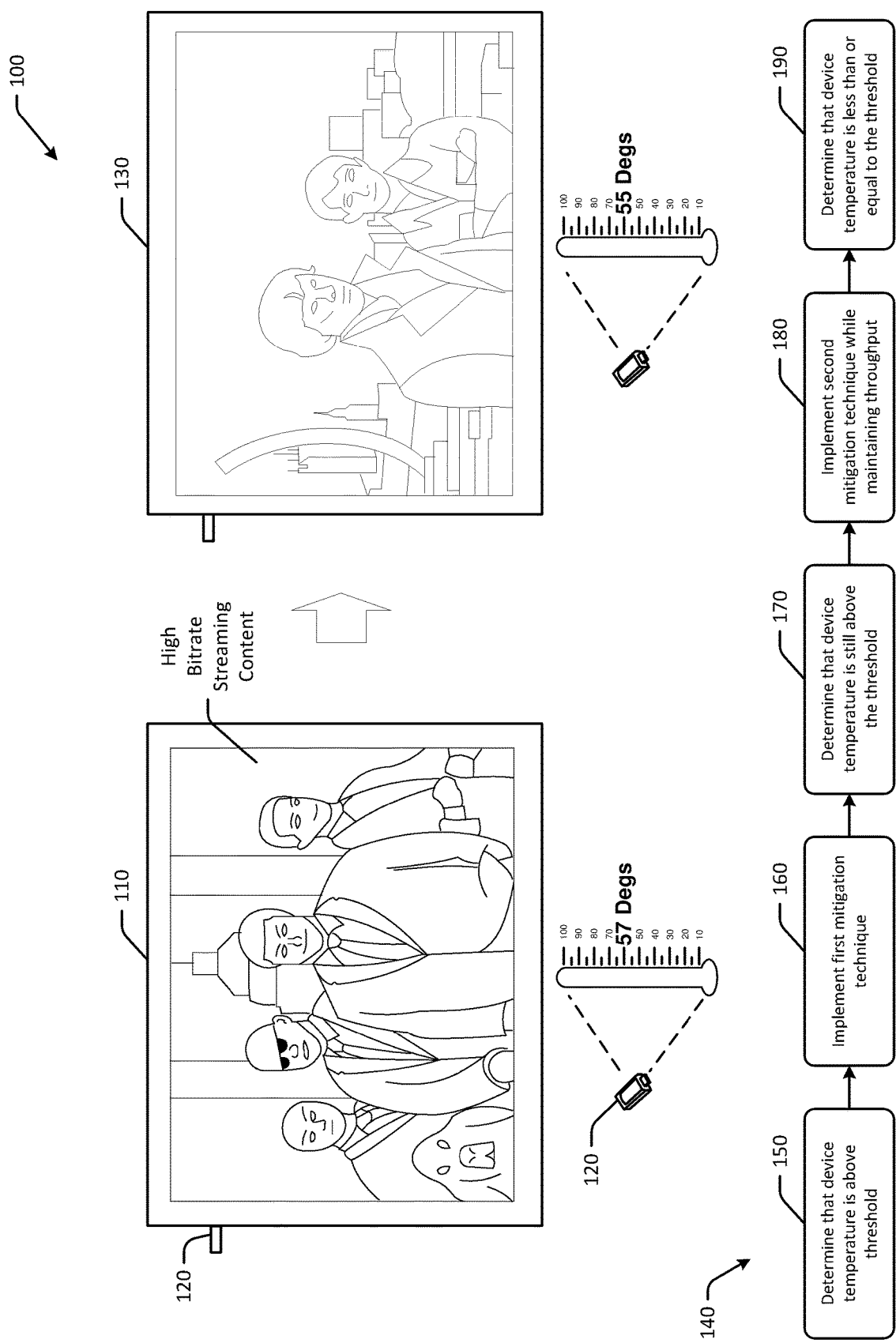
FIG. 1 is a schematic illustration of an example use case for mitigating thermal increases in electronic devices in accordance with one or more example embodiments of the disclosure.

Performance of electronic devices may be impacted by thermal issues, such as increases in temperature. For example, certain electronic devices may experience reduced performance at certain temperatures. For some electronic devices, such as those with small form factors or device housings that are limited in size, relatively small thermal increases can result in reduced or negatively impacted performance, increased housing temperatures, and/or negatively impacted user experiences. For example, a content streaming device that is used to stream high bitrate video may stream content at a reduced bitrate (e.g., dropping from 4K to 1080p, etc.) as a result of thermal increases at the content streaming device. Certain components, such as WiFi chips, of electronic devices may generate heat as a result of high bitrate streaming, high data transmission rates, power consumption, and so forth. For example, the greater the distance between an electronic device and an access point (e.g., router or another networking device that allows electronic devices to wirelessly connect to wired networks, etc.) with which the electronic device is in communication, the greater the amount of power that may be consumed by WiFi components of the electronic device for communication with the access point. Other electronic or electrical components of electronic devices, such as chips, batteries, processors, boards, etc. may cause heat to be generated, and may increase an overall temperature of the electronic device. With small form factor devices, sensitivity to changes in thermal temperature and/or heat generation may be increased, as there may be relatively less airflow than relatively larger form factor devices. Accordingly, mitigation of thermal increases may prevent or delay downgraded performance of electronic devices.

Embodiments of the disclosure include systems and methods for mitigating thermal increases in electronic devices. Certain embodiments may identify or determine temperatures of one or more components of a device, or of a device itself, and may automatically implement one or more response or remedial actions to mitigate thermal increases. In some embodiments, a certain sequence of mitigation techniques may be deployed or implemented, while in other embodiments, particular mitigation techniques may be selected for implementation. For example, certain temperature thresholds may be used to determine a particular mitigation technique that is to be implemented. Some embodiments may implement one or more mitigation techniques at one or more temperature thresholds, so as to mitigate or reduce the temperature of one or more components of the electronic device, while maintaining throughput and/or device performance, so as to avoid potential reduced throughput and/or performance.

This disclosure relates to, among other things, devices, systems, methods, computer-readable media, techniques, and methodologies for mitigating thermal increases in electronic devices. Certain embodiments mitigate thermal increases and/or reduce device temperatures while maintaining an ability to perform at a consistent level and/or throughput. Some embodiments may implement one or more software or hardware changes or mitigation techniques that can allow for electronic devices to have relatively small form factors with a relatively high density of electronic or electrical components. In some instances, embodiments of the disclosure may implement one or more changes to operations performed at, or using, WiFi chip systems of an electronic device. As a result, devices may be able to continue performing uninterrupted, while ensuring device temperatures do not exceed certain thresholds.

Referring to FIG. 1, an example use case 100 for mitigating thermal increases in electronic devices is depicted in accordance with one or more example embodiments of the disclosure. In FIG. 1, at a first instance 110, a content streaming device 120 may be used to stream digital content for display at a television. The digital content may be high bitrate streaming content, or may be of a high resolution, such as 4K video content, and may therefore have a high throughput at the content streaming device 120. Over time, the content streaming device 120 may generate heat, as the continued streaming of digital content may result in relatively high power consumption. For example, at the first instance 110, the content streaming device 120 may have a device temperature of 57 degrees Celsius, which may be greater than a desired device temperature of 55 degrees Celsius. A device temperature may be a temperature of an internal cavity, housing, circuit board, or other component of the content streaming device 120. The device temperature may be indicative of a temperature of an exterior surface of the content streaming device 120 in some instances.

Because the device temperature at the first instance 110 is greater than the desired device temperature, the content streaming device 120 may implement one or more mitigation techniques to reduce the device temperature, so as to avoid downgrading resolution of the high bitrate streaming content, for example. Although downgrading the resolution may result in reduced power consumption, and therefore reduced device temperature, the user experience may be negatively impacted because of the downgraded resolution.

After implementing the one or more mitigation techniques, at a second instance 130, which may occur after the first instance 110 chronologically, the device temperature of the content streaming device may be reduced to the desired device temperature of 55 degrees Celsius. As a result, the content streaming device 120 may continue streaming the high bitrate streaming content without negative impact due to thermal increases.

To mitigate thermal increases and/or reduce device temperatures, an example process flow 140 is presented and may be performed, for example, by the content streaming device 120 and/or under the control of one or more remote servers. In the illustrated embodiment, the content streaming device 120 may include at least one memory that stores computer-executable instructions and at least one processor configured to access the at least one memory and execute the computer-executable instructions to perform various actions or operations, such as one or more of the operations in the process flow 140 of FIG. 1.

At a first block 150, the content streaming device 120 may determine that the device temperature is above a threshold. For example, the content streaming device 120 may monitor temperatures of one or more device components or systems, such as a housing temperature, a WiFi or wireless radio system temperature, a System-on-a-Chip (SoC) system temperature, and/or another system or subsystem temperature. In some instances, device temperatures may be monitored continuously, while in other instances, device temperatures may be queried periodically or at different time intervals. The content streaming device 120 may compare the determined or measured temperatures to one or more threshold values or threshold temperatures. For example, a housing temperature may be compared to a housing threshold temperature, a WiFi system temperature may be compared to a WiFi system threshold temperature, a system on a chip or processor system temperature may be compared to a SoC threshold temperature, and so forth. In some embodiments, a single threshold may be used, while in other embodiments, multiple threshold temperatures may be used. In some instances, multiple threshold temperatures may correspond to the same or different device components. For example, there may be two threshold temperatures, three threshold temperatures, four threshold temperatures, etc. that correspond to the device housing temperature. The threshold temperature(s) for one device component may be different than the threshold temperatures for another device component. For example, in FIG. 1, the device housing temperature threshold temperature may be 55 degrees Celsius, while the WiFi system threshold temperature may be 58 degrees Celsius. At block 150, the content streaming device 120 may determine that the device temperature is equal to or greater than the threshold temperature of 55 degrees Celsius, and may optionally determine that a WiFi system temperature is 58 degrees Celsius, which may be equal to or greater than the 58 degree Celsius WiFi system threshold temperature.

At block 160, the content streaming device 120 may implement a first mitigation technique. For example, certain embodiments may use one or more mitigation techniques or power savings mechanisms to reduce temperatures and/or mitigate thermal increases at the content streaming device 120. A mitigation technique that is implemented may be determined based at least in part on one or more of: which, if any, mitigation techniques are already implemented at the device, an amount of thermal increase and/or an amount by which the device temperature(s) exceed one or more respective threshold temperatures, a hierarchy or predetermined sequence of mitigation techniques, and/or historical performance of certain mitigation techniques at the content streaming device. One or more mitigation techniques and/or power saving mechanisms may be enabled or disabled based at least in part on a thermal state of the content streaming device 120.

For example, a first mitigation technique or power savings mechanism may be to optimize transmission or transmit radio chains. A chain may be a part of a wireless radio used to transmit or receive. Transmit and receive chains may be integrated into a single unit as a transceiver. Transmit radio chains may be used to send or transmit data. For example, radio chains may include physically distinct transmit and receive paths. Devices may include, in some examples, one, two, four, or eight radio chains. Radio chains may include individual antennae. In some embodiments, two antennae may be used for a single radio chain. An example receive radio chain may include one or more low noise amplifiers, one or more mixers, one or more baseband filters, one or more analog-to-digital converters, and/or signal processing components. Disabling a receive radio chain may include disabling use of some or all components in the radio chain. An example transmit radio chain may include one or more digital-to-analog converters, one or more baseband filters, one or more mixers, one or more power amplifier drivers and/or power amplifiers, one or more antennae, and/or one or more signal processing components. Disabling a transmit radio chain may include disabling use of some or all components in the radio chain.

Certain electronic devices may use multiple radio chains to increase transmission speed. For example, devices may use multiple radio chains in parallel to transmit data faster than using a single radio. Optimization of transmit radio chains may include using one transmit radio chain instead of two or more transmit radio chains. Specifically, one or more transmit radio chains may be disabled at least temporarily. The remaining transmit radio chain may be used for acknowledgments and other data transmitted to, for example, an access point. In some embodiments, if the access point data rate drops steeply after disabling one or more transmit radio chains (which may indicate the uplink is limited), the disabled transmit radio chains may be enabled again. By transmitting using only one chain, power consumption of the WiFi system may be reduced.

A second mitigation technique or power savings mechanism may be to optimize receiving or receive radio chains. Receive radio chains may be used to receive data. Certain electronic devices may use multiple radio chains to increase transmission speed. For example, devices may use multiple radio chains in parallel to receive data faster than using a single radio. Optimization of receive radio chains may include using one receive radio chain instead of two or more receive radio chains. Specifically, one or more receive radio chains may be disabled at least temporarily. Disabling one or more receive radio chains may be performed in instances where a signal to noise ratio is sufficient to receive the access point's transmitted rate using a signal antenna. If the signal to noise ratio is not sufficient, the one or more receive radio chains that were disabled may be enabled. By receiving using only one chain, power consumption of the WiFi system may be reduced.

A third mitigation technique or power savings mechanism may be to detect an access point that does not comply with a sleep protocol. For example, access points may be configured to buffer data or traffic designated for a client device when the client device is in a sleep state. Sleep states may be power management features that allow devices to enter into sleep states to preserve energy without frame losses. Sleep states, sleep modes, low power modes, and/or power save modes be implemented by devices to reduce power consumption. Functionality in a sleep state may differ across various communication protocols, device settings, network settings, and so forth. In one example, in a sleep state, a device may not transmit or receive any packets or sense a channel state. Devices may wake from a sleep state at different intervals or asymmetric times, such as beacon intervals, which may be dictated by protocols, during which the device may communicate with other devices as needed. However, some access points may still send data to client devices while the device is (or is reported to be) in a sleep state. As a result, the device may receive the data, thereby consuming power. Certain embodiments may detect access points that do not comply with a sleep protocol, and may implement mitigation techniques accordingly. For example, if the access point complies with a sleep protocol, a mitigation technique may be to cause the electronic device to enter a sleep state for certain lengths of time (e.g., 200 milliseconds, 250 milliseconds, 300 milliseconds, etc.), so as to provide time for thermal relief at the electronic device. The lengths of time may be determined so as to maintain presentation of the high bitrate streaming content. If the access point does not comply with a sleep protocol, a mitigation technique may be to send the access point a medium reservation request, which may be a request to send frame, after which the access point may respond with an approval message, or a clear to send frame. The medium reservation request may be a request to reserve bandwidth and/or a channel at the access point for communication with the electronic device. The medium reservation request may be based on a protocol used for communication with the access point and may have a pre-defined format. In some instances, the medium reservation request may be a data packet, such as a short control packet, with a defined duration indicative of a length of time for which the access point should listen for data from the electronic device. The data packet may include the source, destination, and requested duration of the data transmission period. The access point may respond with a clear to send packet with the same information. As part of certain reservation protocols, other devices that receive the clear to send message will not use the channel until the end of the duration. When the approval message is received, the electronic device may enter a sleep state instead of sending data. In this manner, the electronic device may enter a sleep state for thermal relief without missing any data from the access point, as the access point may listen for data from the electronic device for a sleep state duration or a length of time designated in the medium reservation request or by a protocol. The sleep state duration or length of time may be determined so as to maintain presentation of the high bitrate streaming content.

A fourth mitigation technique or power savings mechanism may be to disconnect and reconnect to the access point as a VHT20 compliant device, or at a 20 MHz channel instead of, for example, an 80 MHz channel. By receiving a reduced bandwidth, the WiFi system may consume reduced power. Session data, such as access point identifiers, IP addresses, authentication information, and the like may be used to reduce reconnection time, which may enable maintenance of the high bitrate streaming connection. For example, the content streaming device 120 may activate a 20 MHz mode at the content streaming device 120, where 20 MHz channels are uses for communication in the 20 MHz mode. Other mitigation techniques and/or power savings mechanisms may be used in different embodiments.

In the example of FIG. 1, to implement the first mitigation technique, the content streaming device 120 may determine that a first transmit radio chain and a second transmit radio chain are active at the content streaming device 120. The first transmit radio chain and the second transmit radio chain may be used to transmit data to an access point that is connected or communicatively coupled to the content streaming device. The content streaming device 120 may disable the first transmit radio chain. If the content streaming device 120 determines that the access point is disconnected from the content streaming device 120, the content streaming device 120 may enable the first transmit radio chain.

At block 170, the content streaming device 120 may determine that the device temperature is still above the threshold. For example, after the first mitigation technique is implemented, the device temperature may reduce to 56 degrees Celsius, which may still be greater than the desired temperature, or threshold, of 55 degrees Celsius.

At block 180, the content streaming device 120 may implement a second mitigation technique while maintaining throughput, so as to maintain playback of the high bitrate streaming content. For the second mitigation technique, the content streaming device 120 may implement a mitigation technique of reducing bandwidth at the content streaming device 120. For example, the content streaming device 120 may activate a 20 MHz mode instead of an 80 MHz mode at the content streaming device 120, where 20 MHz channels are uses for communication in the 20 MHz mode.

At block 190, the content streaming device 120 may determine that the device temperature is less than or equal to the threshold. For example, at the second instance 130, after implementation of the first mitigation technique and the second mitigation technique at the content streaming device 120, the device temperature may be determined to be the desired temperature, or the threshold, of 55 degrees Celsius. Any suitable threshold may be used, and may be dynamically updated.

After the device temperature(s) is stabilized and/or falls below the threshold for a predetermined length of time, one or more of the mitigation techniques may be undone or reversed over time. For example, after the device temperature is determined to be equal to or less than 55 degrees Celsius for a time period of 10 minutes, the second mitigation technique may be reversed or partially reversed. After the second mitigation technique is reversed or undone, and the device temperature remains stable and/or is determined to be equal to or less than 55 degrees Celsius for another time period (which may be same or different than the 10 minute time period in this example), the first mitigation technique may be reversed or undone. As a result, the minimal number (which may be 0) of mitigation techniques may be implemented at the content streaming device 120 to maintain the device temperature and throughput.

For example, if the second mitigation technique was reducing the bandwidth at the content streaming device 120, the content streaming device 120 may activate an 80 MHz mode at the content streaming device 120, where the content streaming device 120 uses 80 MHz channels for communication in the 80 MHz mode. If the second mitigation technique was entering a sleep state for multiple sessions, the content streaming device 120 may prevent the content streaming device 120 from entering the sleep state during a streaming session or until further mitigation techniques are needed.

Embodiments of the disclosure may include systems and methods to reduce device temperatures, reduce device and/or component power consumption, and/or mitigate thermal increases, so as to avoid negatively impacting device performance. Some embodiments may track effectiveness of various mitigation techniques over time, so as to fine tune mitigation technique selection and/or implementation over time. One or more mitigation techniques and/or power saving mechanisms may be enabled or disabled based at least in part on a thermal state of the electronic device.

Example embodiments of the disclosure provide a number of technical features or technical effects. For example, in accordance with example embodiments of the disclosure, certain embodiments of the disclosure may automatically implement one or more mitigation techniques, determine device temperatures, determine performance of various mitigation techniques, and/or maintain device throughput while reducing power consumption. As a result of improved functionality, throughput may be maintained while mitigating thermal increases. Embodiments of the disclosure may improve computing efficiency and bandwidth by reducing power consumption and maintaining device temperatures using one or more thresholds. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
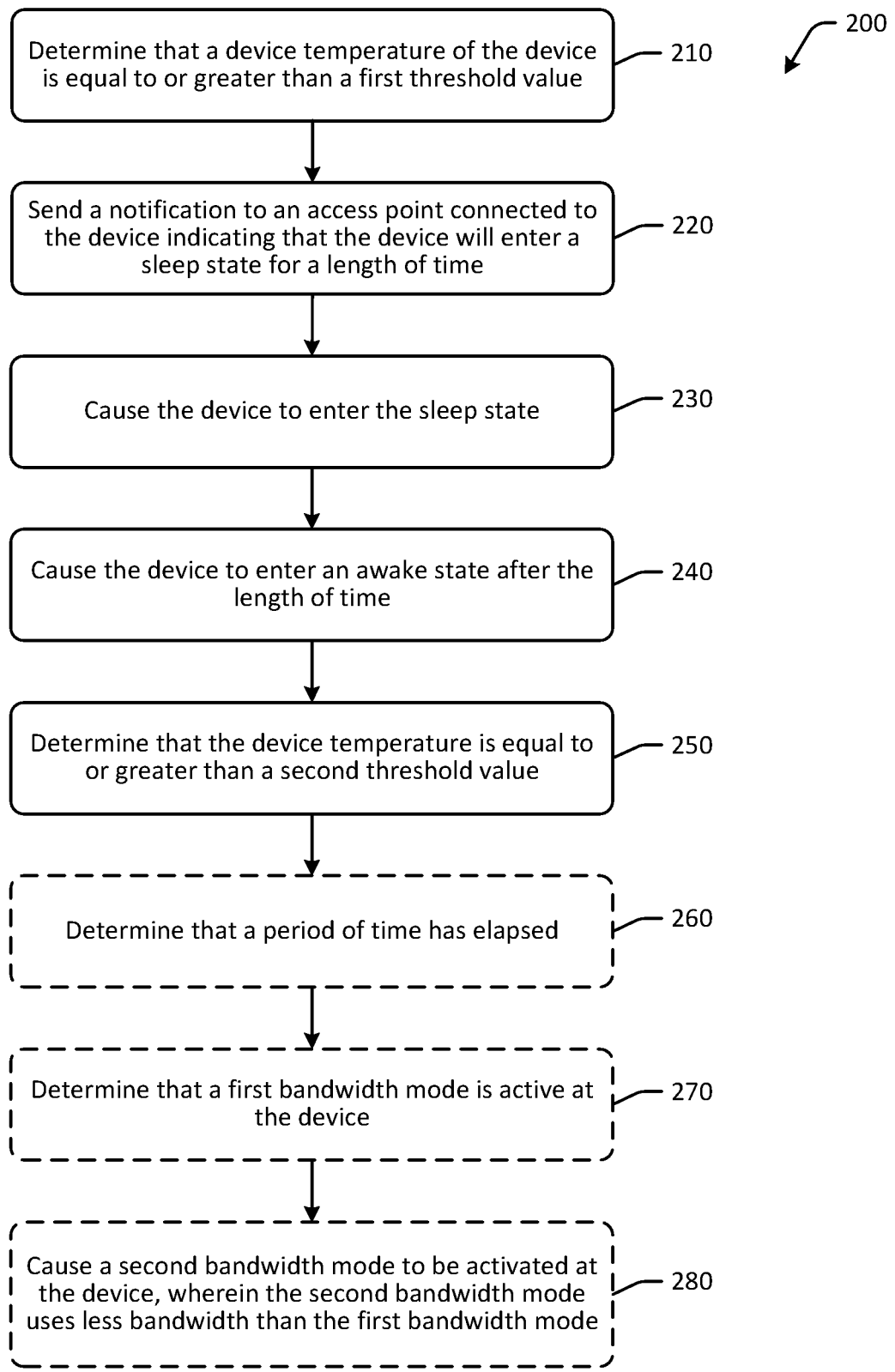
FIG. 2 is a schematic illustration of an example process flow for mitigating thermal increases in electronic devices in accordance with one or more example embodiments of the disclosure.

FIG. 2 depicts an example process flow 200 for mitigating thermal increases in electronic devices in accordance with one or more example embodiments of the disclosure. While example embodiments of the disclosure may be described in the context of content streaming devices and/or devices with certain form factors, it should be appreciated that the disclosure is more broadly applicable to any type of electronic device. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a content streaming device, may be executed to determine that a device temperature of the device satisfies or is greater than or equal to a first threshold temperature. For example, a content streaming device may determine that a device temperature, which may be an internal cavity temperature and/or a housing temperature of the device, is equal to or greater than a first threshold temperature. The first threshold temperature may be programmable and/or dynamic, and may be specific to the device or device type in some embodiments. The first threshold temperature may be a predetermined increment greater than a baseline temperature of the device. The baseline temperature may be a preset normal operating temperature, or may be determined over time based at least in part on measured temperature data.

In some embodiments, a plurality of device component temperatures may be determined and/or measured, such as using one or more temperature sensing devices, and may be compared to the first threshold temperature to determine whether the first threshold temperature is satisfied. For example, a WiFi system or wireless radio system temperature may be determined, a SoC temperature may be determined, a battery temperature (if applicable) may be determined, and so forth. The respective device component temperatures may be compared to the same or different thresholds. For example, the WiFi system temperature may be compared to a threshold temperature that is different than a threshold temperature for the SoC temperature, and so forth. The respective threshold temperatures may be determined using baseline operation temperatures for the respective components, in some embodiments. In some embodiments, one or more computer processors of the electronic device may receive one or more temperature measurements corresponding to temperatures of one or more components of the streaming device from respective temperature sensing devices. The temperature measurements may be compared to respective threshold temperatures, or the same threshold temperature.

At block 220 of the process flow 200, computer-executable instructions stored on a memory of a device may be executed to send a notification to an access point communicatively coupled to the device indicating that the device will enter a sleep state for a length of time. For example, the content streaming device may send a notification to a communicatively coupled access point indicating that the content streaming device will enter a sleep state for a length of time. The notification may be a protocol specific sleep notification, such as a null frame, or another notification. In some embodiments, to send the sleep notification, the device may send a ping frame to the access point, and may send a null frame to the access point. The null frame may be sent after the ping frame, and may indicate that the device is going to enter a sleep state. The notification may include, in some embodiments, an indication of a length of time for which the device will be in the sleep state. In some instances, the length of time may be protocol-specific, such that the device may enter an awake state periodically to receive and/or send data to the access point. After sending the notification, in some instances, the access point may optionally send a response to the device. The access point may buffer traffic or data intended for the device during the length of time, during which the device is to be in a sleep state. The length of time may be determined based at least in part on a difference between the device temperature and the first threshold temperature. For example, the greater the difference, the longer the length of time may be. The length of time may be for an individual sleep state session, or may be for multiple sleep state sessions. In some embodiments, the device may enter a sleep state for a period of time, wake up to receive data, go back to sleep, and so forth until the total length of time spent in the sleep state equals the length of time and/or until the device temperature is at or below the first threshold temperature.

At block 230 of the process flow 200, computer-executable instructions stored on a memory of a device may be executed to cause the device to enter the sleep state. For example, the device may enter a sleep state for the duration of the length of time. The sleep state may include reducing operations and/or power consumption by one or more components of the device. In some embodiments, the content streaming device may not send or receive data while in the sleep state.

At block 240, computer-executable instructions stored on a memory of a device may be executed to cause the device to enter an awake state after the length of time. For example, after the length of time has elapsed, the device may enter or return to an awake state. In the awake state, the device may resume functionality that was disabled or reduced during the sleep state. For example, a wireless radio system may be activated in the awake state after being deactivated in the sleep state.

At block 250, computer-executable instructions stored on a memory of a device may be executed to determine that the device temperature is greater than or equal to a second threshold temperature. For example, the content streaming device may determine, based at least in part on temperature data, that the device temperature is equal to or greater than a second threshold temperature. The second threshold temperature may be greater than the first threshold temperature. For example, the second threshold temperature may be 97 degrees Fahrenheit, while the first threshold temperature may be 95 degrees Fahrenheit. The increase in device temperature may indicate that although the device entered one or more sleep state cycles (e.g., entered the sleep state, entered the awake state, entered the sleep state, etc. for a period of time), the device temperature still increased so as to satisfy the second threshold temperature. This may be a result of continued use (e.g., continued high bitrate streaming, etc.). As a result, the device may optionally implement additional mitigation techniques. As discussed, more than one component temperature may be used, along with more than one threshold temperature.

At optional block 260, computer-executable instructions stored on a memory of a device may be executed to determine that a period of time has elapsed. For example, the content streaming device may determine that a period of time has elapsed after entering the awake state and/or completing a sleep state cycle. In some instances, the effect or impact of a mitigation technique, such as the sleep cycle mitigation technique, may take time to be reflected in the device temperature. This may be because the temperature decrease may not be immediately measurable and may take time to be determined. Accordingly, in some embodiments, the device may determine that a period of time has elapsed. The period of time may be provided so as to allow time for the effect of the mitigation technique to be determined. The period of time may be the same or different for different mitigation techniques, as some mitigation techniques may lead to quicker changes in temperature than others. Actual performance data, such as the mitigation technique implemented and the corresponding change in temperature in a period of time may be determined and/or stored by the device and/or a remote server. In some instances, after the period of time has elapsed, the device temperature may be determined to determine whether the device temperature was impacted by the mitigation technique.

At optional block 270, computer-executable instructions stored on a memory of a device may be executed to determine that a first bandwidth mode is active at the device. For example, the content may determine that a first bandwidth mode of 80 MHz bandwidth communication is active at the device, or is being used for communication. If the device temperature is still determined to satisfy one or more threshold temperatures after the period of time has elapsed at optional block 260, the process flow 200 may proceed to optional block 270 at which a bandwidth mode reduction mitigation technique may be implemented.

At optional block 280, computer-executable instructions stored on a memory of a device may be executed to cause a second bandwidth mode to be activated at the device, wherein the second bandwidth mode uses less bandwidth than the first bandwidth mode. For example, the content streaming device may cause a second bandwidth mode of 40 MHz or 20 MHz, or another bandwidth mode, to be activated, where the second bandwidth mode uses less bandwidth than the first bandwidth mode of, for example, 80 MHz. The reduced bandwidth may result in reduced power consumption and may therefore provide thermal relief for the device, reducing device temperatures.

In some embodiments, one or more machine learning models may be used in order to improve subsequent mitigation techniques. For example, after implementing a certain mitigation technique, data such as the time to reduce the device temperature by a certain amount may be captured and stored, as well as data related to whether device performance was affected (e.g., was high bitrate streaming still possible, etc.), may be captured and stored and used for determining a subsequent sequence of mitigation techniques to implement at the same or different device temperatures.

Figure 3:
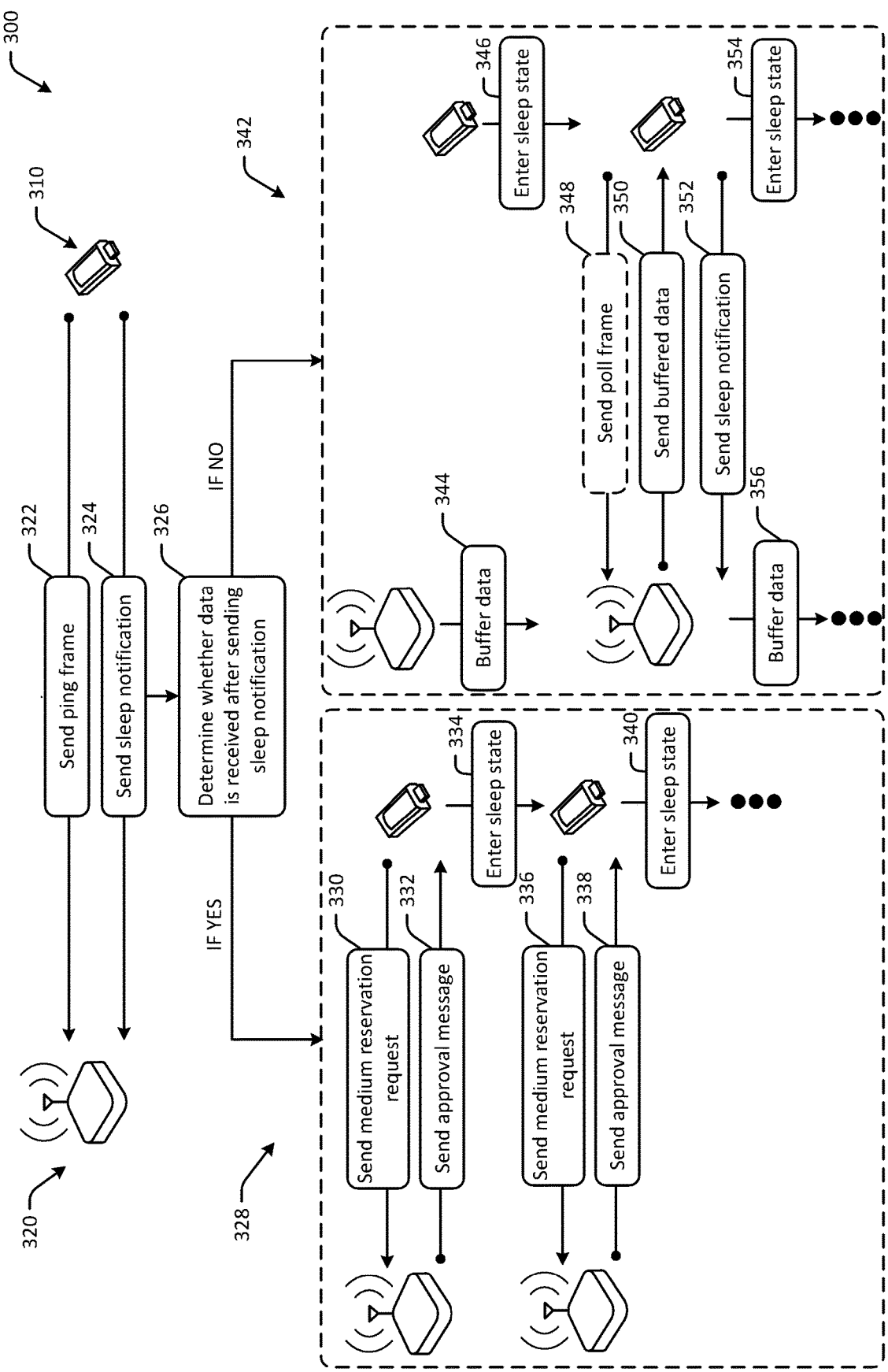
FIG. 3 is a schematic illustration of an example hybrid data and process flow for determining a status of an access point in accordance with one or more example embodiments of the disclosure.

FIG. 3 is a schematic illustration of an example hybrid data and process flow 300 for determining a status of an access point in accordance with one or more example embodiments of the disclosure. Different embodiments may include different, additional, or fewer operations than those illustrated in the example of FIG. 3. The data and process flow 300 may be used to determine whether an access point that an electronic device, such as a content streaming device, is in communication with has a compliant status or a non-compliant status with a sleep protocol.

In some embodiments, when a device is in a sleep state or a sleep mode, data intended for the device may be buffered at an access point if the access point is compliant. The buffered data may be sent to the device at a scheduled wakeup interval or at another time, such as responsive to a request from the device. However, if the access point is non-compliant, the access point may not buffer some or all frames or data intended for the device, and may send the data to the device while the device is in a sleep state. This may cause the device to prematurely enter an awake state, which may reduce an impact of thermal increase mitigation resulting from sleeping. Certain embodiments may detect non-compliant access points, and may implement one or more techniques to retain thermal increase mitigation regardless of the non-compliant status of access points.

At an optional first operation 322 of the data and process flow 300, a streaming device 310 may send a ping frame or ping notification to an access point 320. The ping frame may be used to indicate an active connection between the streaming device 310 and the access point 320. A response message responsive to the ping notification may be received from the access point 320.

At a second operation 324, the streaming device 310 may send a sleep notification to the access point 320. For example, the streaming device 310 may send a null frame to the access point 320. The null frame or other sleep notification may indicate a state of the streaming device 310, such as an awake state or a sleep state, to the access point 320. In this example, the sleep notification may indicate that the streaming device 310 is in a sleep state. However, the streaming device 310 may not enter a sleep state after sending the sleep notification, and may instead remain in an awake state and monitor for frames or data from the access point 320.

At a third operation 326, the streaming device 320 may determine whether data is received after sending the sleep notification. In particular, the streaming device 320 may determine whether any frames are received from the access point after the sleep notification is sent. Accordingly, the streaming device 320 may remain in an awake state after sending the sleep notification in some instances to monitor for frames or data from the access point 320. In some embodiments, the WiFi system of the streaming device 320 may remain in an awake state for a predetermined number of beacon intervals after sending the sleep notification, and may determine or otherwise detect if the access point 320 sends the streaming device 310 any data. In some embodiments, the streaming device 310 may determine whether the access point 320 sends a threshold number of frames or packets while the streaming device 310 is supposed to be in a sleep state or during an unscheduled wake period. In some embodiments, the streaming device 310 may perform operation 326 a number of times or iteratively to determine whether the access point 320 consistently sends data to the streaming device 310 while the streaming device 310 is supposed to be in a sleep state. Accordingly, a determination of whether or not data is received after sending the sleep notification may be made more than once to determine whether the access point consistently sends data to the streaming device 310 while the streaming device 310 is supposed to be in a sleep state.

In some embodiments, the streaming device 310 may send a sleep notification to the access point 320 indicating that the streaming device 310 will enter a sleep state for a first length of time. The first length of time may be determined based at least in part on medium utilization, an amount of desired thermal relief, active protocol, and/or other factors.

If it is determined that data is received after sending the sleep notification at operation 326, the access point 320 may be determined to be non-compliant. The data and process flow 300 may proceed to a non-compliant process flow 328. If the access point 320 is determined to be non-compliant, the streaming device 310 may send a medium reservation request to the access point 320 at a fourth operation 330. For example, the streaming device 310 may send a request to send frame to the access point 320, which may indicate that the streaming device 310 intends to send data to the access point 320. The request to send frame or other medium reservation request may include a time value that is requested by the streaming device 310 for sending the data.

The access point 320 may receive the medium reservation request and may, at a fifth operation 332, send an approval message to the streaming device 310. The approval message may be an acknowledgment or other message, and may include a time value indicating an amount of time that is reserved for the streaming device 310 to send data to the access point 320. The time value may be the same as that requested by the streaming device 310, if applicable, or may be determined by the access point 320. During the time value or time period reserved for the streaming device 310 to send data to the access point 320, the access point 320 may not send data to, or in some instances communicate with, the streaming device 310 or other connected devices in the network.

The streaming device 310 may receive the approval message from the access point 320, and at a sixth operation 334, the streaming device 310 may enter a sleep state. The streaming device 310 may enter a sleep state instead of sending data to the access point 320. The streaming device 310 may enter the sleep state for the time value indicated by the access point 320, such as about 100 milliseconds, 200 milliseconds, etc. This may not impact performance because the access point 320 may not send data to the streaming device 310 while waiting for the streaming device 310 to send data to the access point 320 during the reserved time interval. As a result, the streaming device 310 may sleep for a length of time for thermal relief, without increasing a risk of errors or reduced data transmission.

The streaming device 310 may implement more than one sleep cycle for thermal relief. For example, at a seventh operation 336, the streaming device 310 may again send a medium reservation request to the access point 320, and at an eighth operation 338, the access point 320 may send an approval message to the streaming device 310. Once the approval message is received, the streaming device 310 may enter the sleep state at a ninth operation 340. The streaming device 310 may continue as needed to reduce one or more device temperatures and/or component temperatures and/or to mitigate thermal increases.

Reserving medium at the access point 320 for lengths of time may impact overall network performance, as the access point 320 may reduce or pause communications with other devices connected to the access point 320. Accordingly, some embodiments may track an amount of medium utilization at the access point 320 that is attributable to the streaming device 310. For example, during a connection session, the streaming device 310 may determine an amount of medium of the access point 310 used by or attributable to the streaming device 310, and may determine subsequent requested lengths of time based at least in part on the amount of medium utilization. For example, after a certain amount of utilization, the streaming device 310 may reduce the amount of reserved time or number of reservation requests sent to the access point 320, so as to limit impact to performance of the access point 320 and/or other connected devices.

In some embodiments, the medium reservation request sent by the streaming device 310 may request to block or reserve only a certain channel, such as a channel with a bandwidth of 20 MHz, to reduce impact to the overall network. By sleeping, the power consumption of the streaming device 310 may be reduced as a result of sleeping receive antennae instead of listening.

If it is determined that data is not received after sending the sleep notification at operation 326, the access point 320 may be determined to be compliant. The data and process flow 300 may continue to a compliant access point data and process flow 342. Compliant access points may buffer traffic for sleeping devices while the devices are in sleep states. Accordingly, at a tenth operation 344, the access point 320 may buffer data for the streaming device 310 after receiving the sleep notification at the second operation 324. At an eleventh operation 346, the streaming device 310 may enter the sleep state after sending the sleep notification. The access point 320 may buffer data for the streaming device 310 while the streaming device 310 is in the sleep state. In some embodiments, the streaming device 310 may sleep for a programmable value or percentage of a 100 millisecond beacon interval, and then wake up to receive the beacon. Constriction of available bandwidth may backpressure the downlink application to reduce its traffic, which may reduce power consumption.

At an optional twelfth operation 348, the streaming device 310 may send a poll frame to the access point 320. The poll frame may indicate that the streaming device 310 is in an awake state and may be a request for any buffered data for the streaming device 310 at the access point 320. If there is no data, the streaming device 310 may return to the sleep state.

At a thirteenth operation 350, the access point 320 may send the buffered data to the streaming device 310. The buffered data may be sent at a predetermined wakeup time, which may be based on protocol. For example, beacons may be used to wake up the streaming device 310, or the streaming device 310 may wake up at a predetermined beacon interval to receive a beacon.

At a fourteenth operation 352, the streaming device 310 may send another sleep notification to the access point 320. At a fifteenth operation 354, the streaming device 310 may enter the sleep state. The access point 320 may buffer data for the streaming device 310 while the streaming device 310 is in the sleep state at a sixteenth operation 356. The streaming device 310 may perform a number of sleep cycles to achieve thermal relief.

Figure 4:
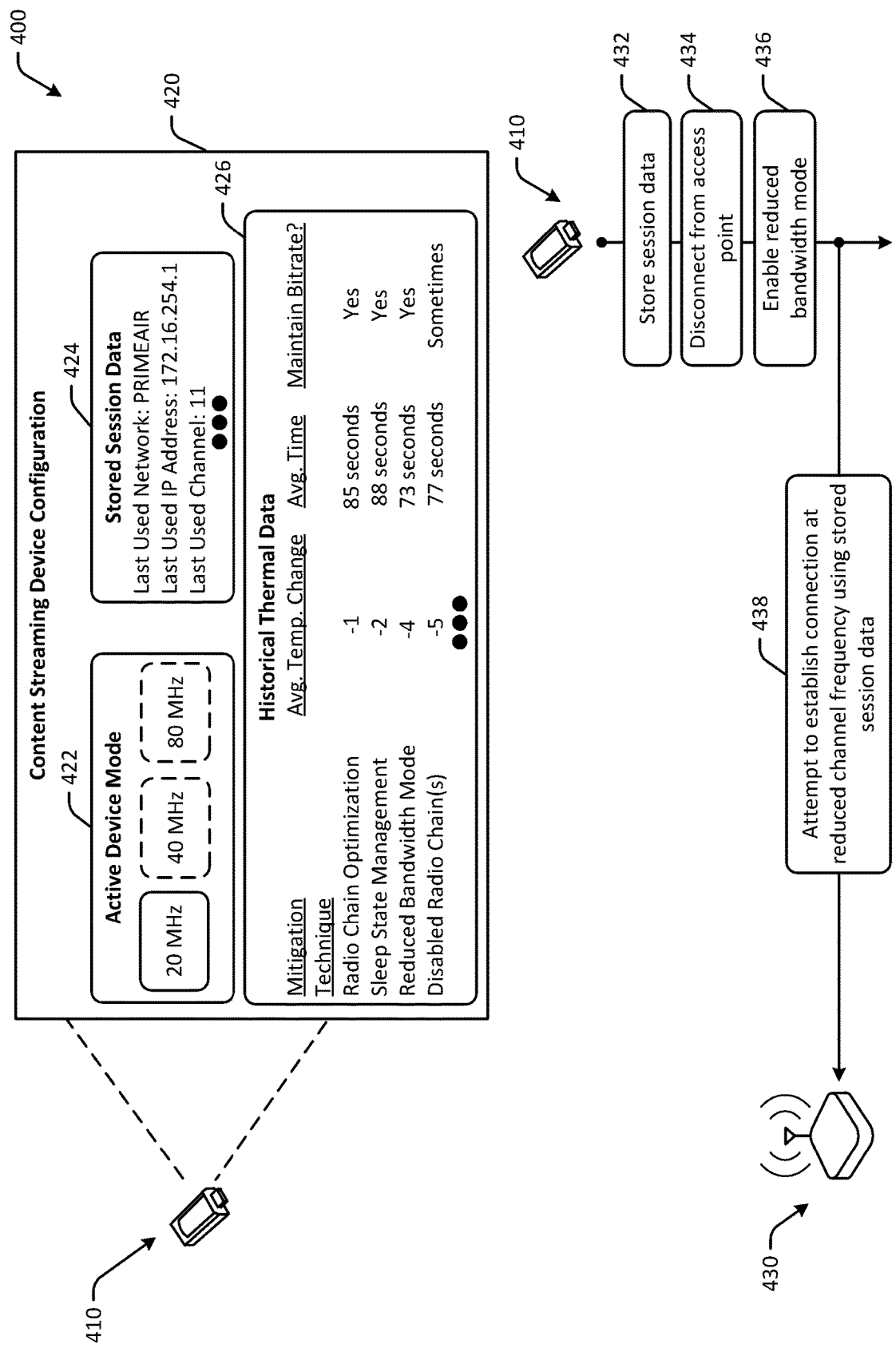
FIG. 4 is a schematic illustration of an example use case and process flow for reducing a channel bandwidth mode at an electronic device in accordance with one or more example embodiments of the disclosure.

FIG. 4 is a schematic illustration of an example use case and process flow 400 for reducing a bandwidth mode at an electronic device in accordance with one or more example embodiments of the disclosure. Different embodiments may include different, additional, or fewer operations than those illustrated in the example of FIG. 4. The data and process flow 400 may be used to determine whether to implement a mitigation technique that reduces bandwidth at a streaming device, and if so, an example method of implementing the mitigation technique.

In FIG. 4, a streaming device 410 may have a device configuration 420. The device configuration 420 may include device settings, stored information, performance data, and/or other information. For example, the device configuration may include an active device mode setting 422, stored session data 424, and historical thermal data 426.

The active device mode setting 422 may indicate a bandwidth or bandwidth mode setting that is active at the streaming device 410. For example, in FIG. 4, a 20 MHz bandwidth mode may be active at the streaming device 410, with additional mode options of 40 MHz and/or 80 MHz.

The stored session data 424 may include wireless connection session data. In some instances, the stored session data 424 may include session data for a most recent wireless connection. The stored session data 424 may include, for example, a last used network identifier, a last used IP address, a last used channel, authentication credentials, and/or other data. The stored session data 424 may be used to reduce connection times when reestablishing a wireless connection.

The historical thermal data 426 may include data related to device-specific results of mitigation techniques. For example, various mitigation techniques that have been implemented at the streaming device 410 and the corresponding effects and/or metrics may be stored as part of the historical thermal data. In the example of FIG. 4, the historical thermal data 426 may indicate that a radio chain optimization mitigation technique is associated with an average temperature change of −1 degree Celsius in an average time of 85 seconds, or that implementing the radio chain optimization mitigation technique on average causes a 1 degree reduction in device temperature after 85 seconds of implementation, while maintaining a desired bitrate of streaming content. The historical thermal data 426 may indicate that a sleep state management mitigation technique is associated with an average temperature change of −2 degrees Celsius in an average time of 88 seconds, or that implementing the sleep state management mitigation technique on average causes a 2 degree reduction in device temperature after 88 seconds of implementation, while maintaining a desired bitrate of streaming content. The historical thermal data 426 may indicate that a reduced bandwidth mitigation technique is associated with an average temperature change of −4 degrees Celsius in an average time of 73 seconds, or that implementing the reduced bandwidth mitigation technique on average causes a 4 degree reduction in device temperature after 73 seconds of implementation, while maintaining a desired bitrate of streaming content. The historical thermal data 426 may indicate that a disabled radio chain(s) mitigation technique is associated with an average temperature change of −5 degrees Celsius in an average time of 77 seconds, or that implementing the disabled radio chain(s) mitigation technique on average causes a 5 degree reduction in device temperature after 77 seconds of implementation, while sometimes maintaining a desired bitrate of streaming content (e.g., for example, the bitrate may be maintained when the streaming device 410 is physically close to the access point, but may not be maintained if the distance is too far, etc.). Whether or not a bitrate was maintained may be determined for individual bitrate values. For example, a 4K bitrate may not have been maintained after implementation of a certain mitigation technique, but a 1080p or 720p bitrate may have been maintained. Accordingly, bitrate maintenance data may be captured and/or stored for multiple bitrate values. Other or different mitigation techniques may be included. In some embodiments, historical thermal data may be determined based on aggregate data for streaming devices, rather than the streaming device 410 alone. Thermal data from a number of devices may be captured and used for optimization and/or selection of mitigation techniques in various situations.

The historical thermal data 426 may be used to improve selection of a mitigation technique in certain situations, or instances where a known amount of heat reduction or power consumption reduction is desired. For example, if a temperature change of −4 degrees is desired as soon as possible, the streaming device 410 may determine or select a reduced bandwidth mitigation technique. In another example, the streaming device 410 may determine a difference between a device temperature and a first threshold temperature, and may determine, using the historical thermal data, a historical length of time to reduce the device temperature by the difference. Based at least in part on the amount of time it historically takes the device to change temperature responsive to a certain mitigation technique, the streaming device 410 may determine a length of time for which to implement any given mitigation technique.

To implement the reduced bandwidth mitigation technique, the streaming device 410 may, at a first operation 432, store session data. The stored session data may be for an active wireless connection, such as a connection to an access point 430. The streaming device 410 may store a channel, IP address, etc. associated with the connection to the access point 430. At a second operation 434, the streaming device 410 may disconnect from the access point 430. Specifically, one or more computer processors of the streaming device 410 may cause the streaming device 410 to disconnect from the access point 410. At a third operation 436, the streaming device 410 may enable a reduced bandwidth mode. For example, the streaming device 410 may enable or activate a 20 MHz bandwidth mode instead of an 80 MHz bandwidth mode. At a fourth operation 438, the streaming device 410 may attempt to establish a connection at the reduced bandwidth using the stored session data. For example, the streaming device 410 may initiate a connection to the access point 430 after the second bandwidth mode is activated using the stored session data, which may include a channel and/or IP address. By using the stored session data, reconnection time between the streaming device 410 and the access point 430 may be reduced, as the streaming device 410 may not have to scan for available access points or networks, and so forth.

Figure 5:
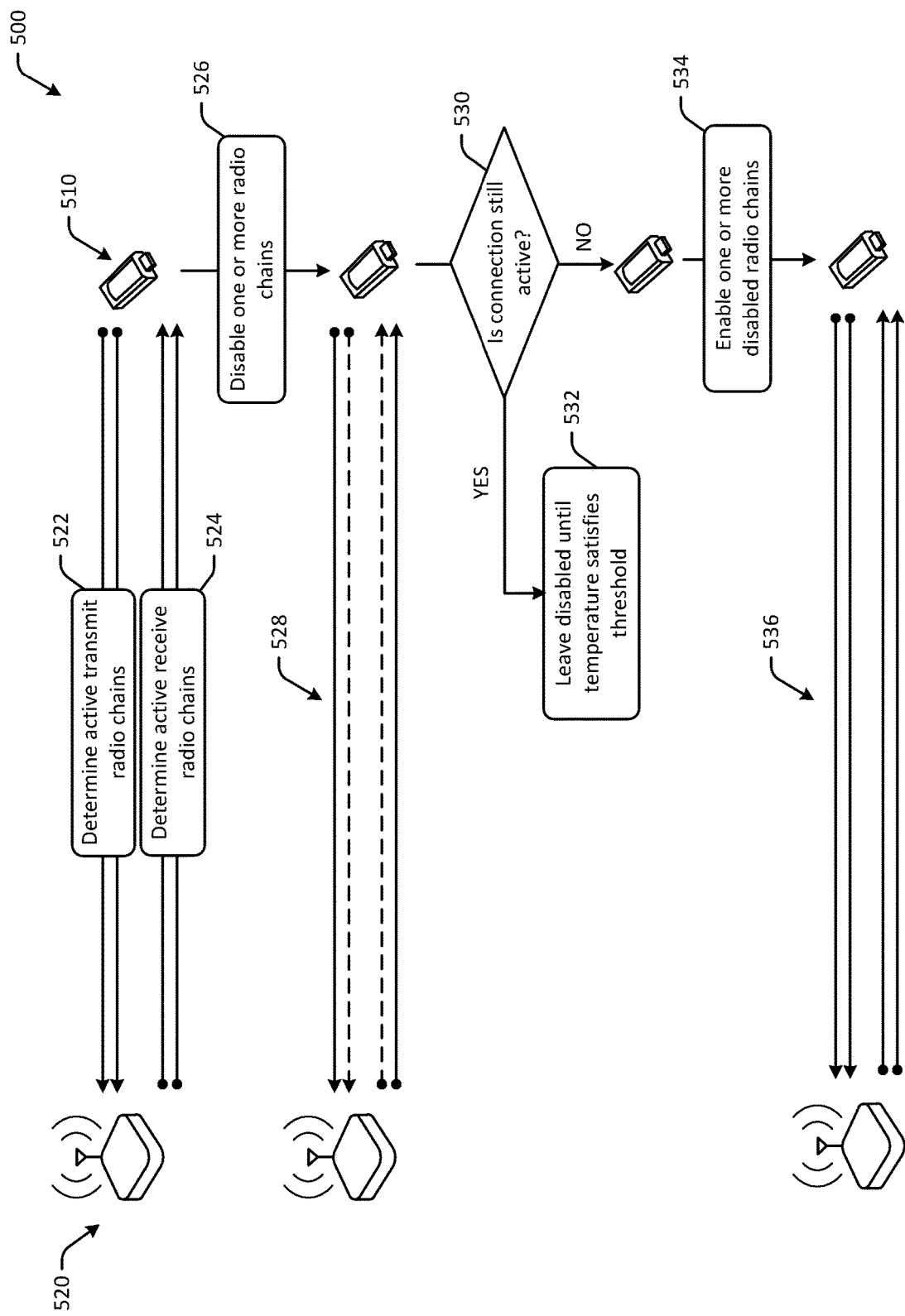
FIG. 5 is a schematic illustration of an example hybrid data and process flow for modifying WiFi characteristics of an electronic device in accordance with one or more example embodiments of the disclosure.

FIG. 5 is a schematic illustration of an example hybrid data and process flow 500 for modifying WiFi characteristics of an electronic device in accordance with one or more example embodiments of the disclosure. Different embodiments may include different, additional, or fewer operations than those illustrated in the example of FIG. 5. The data and process flow 500 may be used to determine whether to implement a mitigation technique that reduces transmit and/or receive radio chains at a streaming device, and if so, an example method of implementing the mitigation technique.

In FIG. 5, a streaming device 510 may be communicatively coupled to an access point 520. The streaming device 510 may use one or more transmit radio chains to send data to the access point 520. For example, the streaming device 510 may use two transmit radio chains to send data to the access point 520. Similarly, the streaming device 510 may use two receive radio chains to receive data from other devices, such as the access point 520. Using two (or more) radio chains may increase a transmission speed and/or rate of data transfer. However, using two (or more) radio chains may increase power consumption at the streaming device 510, thereby increasing an amount of heat generated.

Accordingly, in some embodiments, a mitigation technique to reduce power consumption and/or mitigate thermal increases may be to reduce a number of transmit radio chains and/or receive radio chains that are used by the streaming device 510.

For example, in FIG. 5, at a first operation 522, the streaming device 510 may determine a number of active transmit radio chains. In the illustrated example, the streaming device 510 may use two active transmit radio chains. At a second operation 524, the streaming device 510 may determine a number of active receive radio chains. In the illustrated example, the streaming device 510 may use two active receive radio chains.

At a third operation 526, the streaming device may at least temporarily disable one or more radio chains. For example, if more than one transmit radio chain is being used, the streaming device 510 may disable transmit radio chains until there is one transmit radio chain that remains active. In another example, if there is more than one active receive radio chain, the streaming device 510 may disable receive radio chains until there is one receive radio chain that remains active. In some embodiments, excess transmit radio chains may be disabled before excess receive radio chains are disabled, while in other embodiments, excess receive radio chains may be disabled before excess transmit radio chains are disabled. In some embodiments, transmit radio chains and receive radio chains may be disabled at the same time or substantially the same time. If it is determined that there is a single active transmit radio chain at the first operation 522 and/or a single active receive radio chain at the second operation 524, the streaming device 510 may select a different mitigation technique, or may disable the remaining transmit radio chain and/or receive radio chain.

The streaming device 510 may be able to communicate with a single transmit radio chain and/or a single receive radio chain without interruption, although data transmission speeds may be impacted, and a distance between the streaming device 510 and the access point 520 may affect throughput. Disabling radio chains may result in reduced power consumption and potentially less antenna usage, which may therefore mitigate thermal increases and/or reduce power consumption at the streaming device 510.

In the example of FIG. 5, the streaming device 510 may disable one transmit radio chain and may disable one receive radio chain, as illustrated at a second instance in time 528 after the third operation 526.

After one or more radio chains are disabled, the streaming device 510 may determine, at determination block 530, whether the connection to the access point 520 is still active. In some instances, disabling one or more radio chains may result in a broken link or lost connection to the access point 520.

If it is determined at determination block 530 that the connection is still active, the data and process flow 500 may continue to a fourth operation 532, at which the disabled radio chain(s) may remain disabled until the device temperature is greater than or equal to a threshold. For example, after a certain length of time, the device temperature may be queried or determined, and if the device temperature is equal to or less than a certain threshold, the disabled radio chain(s) may be re-enabled, or if the device temperature is above the threshold, the disabled radio chain(s) may remain disabled.

If it is determined at determination block 530 that the connection is no longer active, the data and process flow 500 may continue to a fifth operation 534, at which the one or more disabled radio chains may be enabled. As illustrated at a third instance in time 536, the streaming device 510 may enable the disabled radio chain(s), so as to reconnect to the access point 520. In some embodiments, one or more of the disabled radio chain(s) may be enabled at a time, with a determination or attempt to reconnect to the access point 520 occurring after each radio chain is enabled. The determination as to whether the connection is still active at determination block 530 may be made with 0.5 seconds or less, so as to quickly determine whether one or more of the disabled radio chain(s) are to be enabled.

As a result, the throughput and/or data transmission rate may be maintained at the streaming device 510, while power consumption, such as that of a WiFi chip or system may be reduced, and thermal increases may be mitigated.

Figure 6:
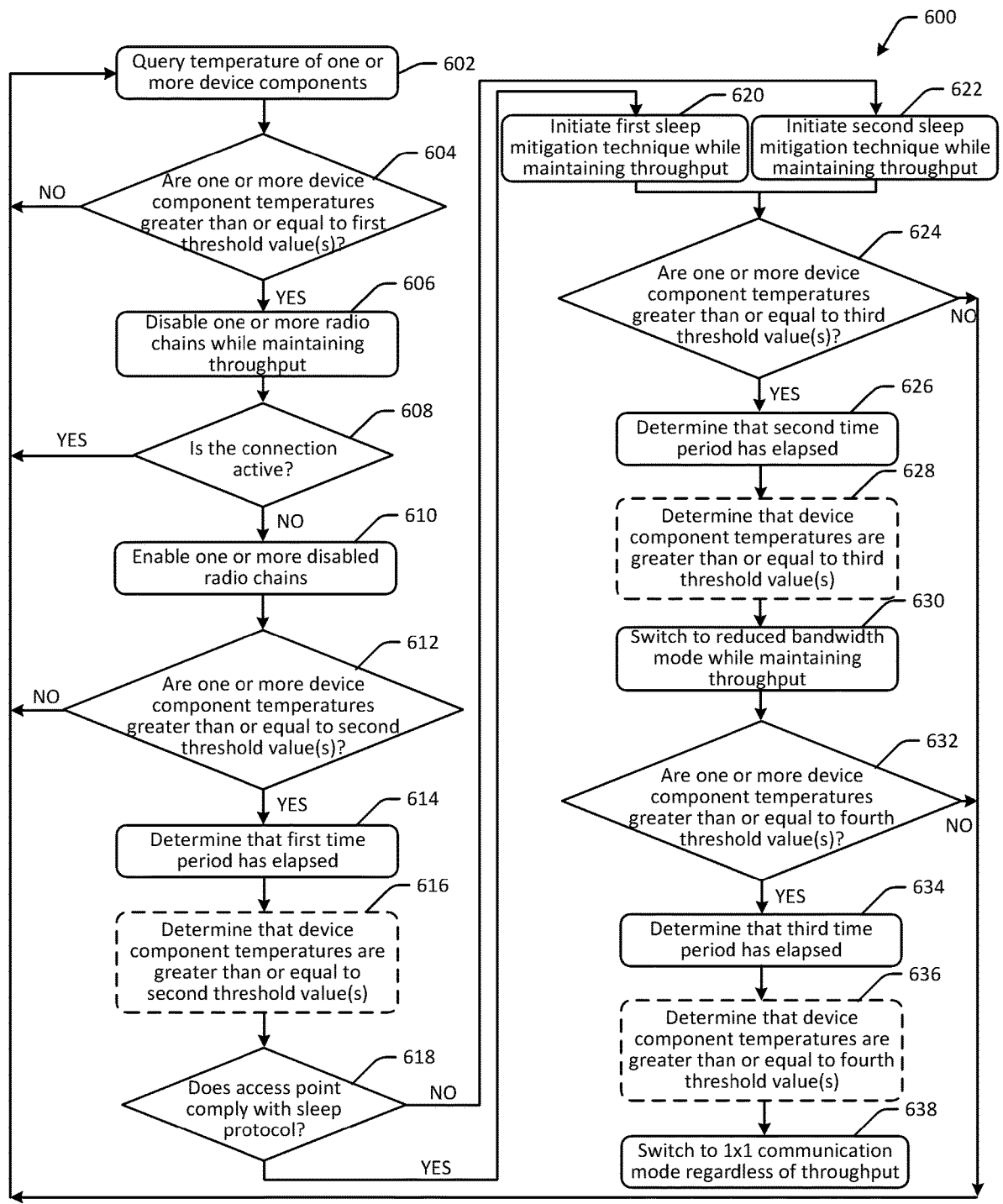
FIG. 6 is a schematic illustration of an example process flow for mitigating thermal increases in electronic devices in accordance with one or more example embodiments of the disclosure.

FIG. 6 is a schematic illustration of an example process flow 600 for mitigating thermal increases in electronic devices in accordance with one or more example embodiments of the disclosure. While example embodiments of the disclosure may be described in the context of streaming devices, it should be appreciated that the disclosure is more broadly applicable to any type of electronic devices. Some or all of the blocks of the process flows in this disclosure may be performed in a distributed manner across any number of devices. The operations of the process flow 600 may be optional and may be performed in a different order.

At block 602 of the process flow 600, computer-executable instructions stored on a memory of a device, such as a remote server or a streaming device, may be executed to query one or more temperatures of one or more device components. For example, temperature sensing devices may be used to determine or query a temperature of a WiFi chip or wireless radio system, a SoC system, a device housing and/or cavity temperature, and the like. In some embodiments, multiple temperatures may be determined. In the example of FIG. 6, a device temperature of a housing of the streaming device may be queried and/or determined. The device temperature may be continuously or periodically monitored using one or more temperature sensors or other devices.

At determination block 604 of the process flow 600, computer-executable instructions stored on the streaming device may be executed to determine whether one or more of the device component temperatures are greater than or equal to first threshold temperatures. In some embodiments, each of the device component temperatures may meet or exceed respective threshold temperatures (or the same threshold temperature) for the determination at determination block 604 to be positive. If it is determined at determination block 604 that one or more device component temperatures are not greater than or equal to first threshold temperatures, the process flow 600 may return to block 602, at which the device temperature(s) may be queried or determined again. For example, the determined device temperature may be 55 degrees Celsius, and the first threshold temperature may be 56 degrees Celsius. As a result, the process flow 600 may return to block 602.

If it is determined at determination block 604 that one or more device component temperatures are greater than or equal to first threshold temperatures, the process flow 600 may continue to block 606. For example, the determined device temperature may be 56 degrees Celsius, and the first threshold temperature may be 56 degrees Celsius.

At block 606 of the process flow 600, computer-executable instructions stored on the streaming device may be executed to disable one or more radio chains while maintaining throughput. For example, the streaming device may determine that a first transmit radio chain and a second transmit radio chain are active at the streaming device, and may disable the second transmit radio chain. In some embodiments, a receive radio chain may be disabled instead of, or in addition to, a transmit radio chain. The radio chain(s) may be disabled while a desired throughput, which may be represented by a bitrate of streaming content, is maintained. For example, if disabling a radio chain causes a reduced throughput or the device is unable to continue streaming content at a certain bitrate, the disabled radio chain may be re-enabled, so as to avoid downgraded throughput. The mitigation technique implemented at block 606 may have a minimum impact to throughput.

At determination block 608 of the process flow 600, computer-executable instructions stored on the streaming device may be executed to determine whether a connection to an access point is active. For example, disabling one or more radio chains may cause a connection to be lost. If it is determined that the connection is active at determination block 608, the process flow 600 may return to block 602, at which the device temperature may be queried or determined. If it is determined that the connection is not active at determination block 608, the process flow may proceed to block 610.

At block 610 of the process flow 600, computer-executable instructions stored on the streaming device may be executed to enable the one or more radio chains that were disabled. For example, the streaming device may enable the second transmit radio chain and/or any other radio chains that were disabled at block 606.

At determination block 612 of the process flow 600, computer-executable instructions stored on the streaming device may be executed to determine whether one or more of the device component temperatures are greater than or equal to second threshold temperatures. In some embodiments, each of the device component temperatures may meet or exceed respective threshold temperatures (or the same threshold temperature) for the determination at determination block 612 to be positive. The second threshold temperature may be greater than the first threshold temperature. If it is determined at determination block 612 that one or more device component temperatures are not greater than or equal to second threshold temperatures, the process flow 600 may return to block 602, at which the device temperature(s) may be queried or determined again. For example, the determined device temperature may be 56 degrees Celsius, and the second threshold temperature may be 57 degrees Celsius. As a result, the process flow 600 may return to block 602.

If it is determined at determination block 612 that one or more device component temperatures are greater than or equal to second threshold temperatures, the process flow 600 may continue to block 614. For example, the determined device temperature may be 58 degrees Celsius, and the second threshold temperature may be 57 degrees Celsius.

At block 614 of the process flow 600, computer-executable instructions stored on the streaming device may be executed to determine that a first time period has elapsed. The first time period may be a predetermined length of time that may provide time for any mitigation techniques that have been implemented to impact the device temperature(s).

At optional block 616 of the process flow 600, computer-executable instructions stored on the streaming device may be executed to determine that the device component temperatures are greater than or equal to the second threshold temperatures. Optional block 616 may be implemented so as to determine whether the device temperature has reduced as a result of mitigation techniques that have been implemented. Some embodiments may therefore wait for a time period to elapse, and then determine device temperatures to determine whether the temperature has changed.

At determination block 618 of the process flow 600, computer-executable instructions stored on the streaming device may be executed to determine whether the access point to which the streaming device is connected complies with a sleep protocol. For example, an access point compliance test may be used to determine whether the access point complies with a sleep protocol. An example access point compliance test may include sending a sleep notification to the access point and determining whether the access point buffers traffic intended for the streaming device, in which case the access point may be compliant, or instead sends data to the streaming device while the streaming device is supposed to be in a sleep state, in which case the access point may be non-compliant.

If it is determined that the access point is compliant at determination block 618, the process flow 600 may proceed to block 620. At block 620 of the process flow 600, computer-executable instructions stored on the streaming device may be executed to initiate a first sleep mitigation technique while maintaining throughput. The first sleep mitigation technique may be to send sleep notifications to the access point for brief intervals and to enter a sleep state at the streaming device, so as to reduce power consumption and provide thermal relief. The first sleep mitigation technique may be implemented while a desired throughput is maintained.

If it is determined that the access point is non-compliant at determination block 618, the process flow 600 may proceed to block 622. At block 622 of the process flow 600, computer-executable instructions stored on the streaming device may be executed to initiate a second sleep mitigation technique while maintaining throughput. The second sleep mitigation technique may be to send medium reservation requests to the access point to reserve medium for brief intervals and to enter a sleep state at the streaming device during the reserved time intervals, so as to reduce power consumption and provide thermal relief. The second sleep mitigation technique may be implemented while a desired throughput is maintained.

At determination block 624 of the process flow 600, computer-executable instructions stored on the streaming device may be executed to determine whether one or more of the device component temperatures are greater than or equal to third threshold temperatures. In some embodiments, each of the device component temperatures may meet or exceed respective threshold temperatures (or the same threshold temperature) for the determination at determination block 624 to be positive. The third threshold temperature may be greater than the second threshold temperature. If it is determined at determination block 624 that one or more device component temperatures are not greater than or equal to third threshold temperatures, the process flow 600 may return to block 602, at which the device temperature(s) may be queried or determined again. For example, the determined device temperature may be 57 degrees Celsius, and the third threshold temperature may be 58 degrees Celsius. As a result, the process flow 600 may return to block 602.

If it is determined at determination block 624 that one or more device component temperatures are greater than or equal to third threshold temperatures, the process flow 600 may continue to block 626. For example, the determined device temperature may be 59 degrees Celsius, and the third threshold temperature may be 58 degrees Celsius.

At block 626 of the process flow 600, computer-executable instructions stored on the streaming device may be executed to determine that a second time period has elapsed. The second time period may be a predetermined length of time that may provide time for any mitigation techniques that have been implemented to impact the device temperature(s). The second time period may be of the same length or of a different length than the first time period.

At optional block 628 of the process flow 600, computer-executable instructions stored on the streaming device may be executed to determine that the device component temperatures are greater than or equal to the third threshold temperatures. Optional block 628 may be implemented so as to determine whether the device temperature has reduced as a result of mitigation techniques that have been implemented. Some embodiments may therefore wait for a time period to elapse, and then determine device temperatures to determine whether the temperature has changed.

At block 630 of the process flow 600, computer-executable instructions stored on the streaming device may be executed to switch the streaming device to a reduced bandwidth mode while maintaining throughput. For example, the streaming device may switch from an 80 MHz mode to a 40 MHz or 20 MHz mode. The reduced bandwidth mode may result in reduced power consumption, thereby providing thermal relief at the streaming device. The reduced bandwidth mode may be implemented while a desired throughput is maintained.

At determination block 632 of the process flow 600, computer-executable instructions stored on the streaming device may be executed to determine whether one or more of the device component temperatures are greater than or equal to fourth threshold temperatures. In some embodiments, each of the device component temperatures may meet or exceed respective threshold temperatures (or the same threshold temperature) for the determination at determination block 632 to be positive. The fourth threshold temperature may be greater than the third threshold temperature. If it is determined at determination block 632 that one or more device component temperatures are not greater than or equal to fourth threshold temperatures, the process flow 600 may return to block 602, at which the device temperature(s) may be queried or determined again. For example, the determined device temperature may be 58 degrees Celsius, and the fourth threshold temperature may be 59 degrees Celsius. As a result, the process flow 600 may return to block 602.

If it is determined at determination block 632 that one or more device component temperatures are greater than or equal to fourth threshold temperatures, the process flow 600 may continue to block 634. For example, the determined device temperature may be 62 degrees Celsius, and the fourth threshold temperature may be 60 degrees Celsius.

At block 634 of the process flow 600, computer-executable instructions stored on the streaming device may be executed to determine that a third time period has elapsed. The third time period may be a predetermined length of time that may provide time for any mitigation techniques that have been implemented to impact the device temperature(s). The third time period may be of the same length or of a different length than the first time period and/or the second time period. For example, the third time period may be about 250 milliseconds.

At optional block 636 of the process flow 600, computer-executable instructions stored on the streaming device may be executed to determine that the device component temperatures are greater than or equal to the fourth threshold temperatures. Optional block 636 may be implemented so as to determine whether the device temperature has reduced as a result of mitigation techniques that have been implemented. Some embodiments may therefore wait for a time period to elapse, and then determine device temperatures to determine whether the temperature has changed.

At block 638 of the process flow 600, computer-executable instructions stored on the streaming device may be executed to switch to a 1×1 communication mode regardless of throughput. The 1×1 communication mode may be a mode in which one transmit radio chain is active and one receive radio chain is active. By reducing the number of active radio chains, power consumption may be reduced, thereby providing thermal relief. The switch to 1×1 communication mode may be implemented regardless of whether or not a desired throughput is maintained. For example, for some or all of the other mitigation techniques, the respective techniques may be implemented if a desired throughput can still be achieved or maintained by the device. For the 1×1 communication mode, however, the throughput may be downgraded as a result of the mitigation technique, because thermal relief may take priority over throughput. As a result, if desired throughput is 4K streaming, the streaming may be downgraded to 1080p or another throughput as a result of the mitigation technique implemented at block 638.

The order of operations described in FIG. 6 may be used as a sequence of mitigation techniques that progressively increase in potential impact to continued high bitrate streaming and/or streaming device performance. For example, the second bandwidth mode may be activated after the device temperature is greater than or equal to the second threshold temperature and before the device temperature is greater than or equal to the third threshold temperature. In addition, once a certain mitigation technique is implemented, subsequent iterations through the process flow 600 may bypass the mitigation techniques that are already implemented. By implementing some or all of the mitigation techniques, the streaming device may be able to stream content at desired bitrates continuously, without negative impact as a result of thermal issues.

Sequences of implementation may vary based at least in part on one or more metrics. For example, using a received signal strength indicator (RSSI), the operation at block 606 may or may not be implemented. For example, if the RSSI is below a certain threshold, this may indicate that disabling a radio chain may result in reduced throughput and/or an inability to maintain a desired bitrate. As a result, the implementation technique may be bypassed, so that another implementation technique can be implemented without negatively impacting the throughput or desired bitrate.

After thermal relief is achieved, mitigation techniques may be undone or reversed in the opposite of the order in which they were implemented. For example, in FIG. 6, after temperatures are stabilized or reduced, the device may undue the 1×1 communication mode, switch to the higher bandwidth mode, cancel subsequent sleep state events or sleep cycles during the streaming session, enable radio chains, and so forth.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
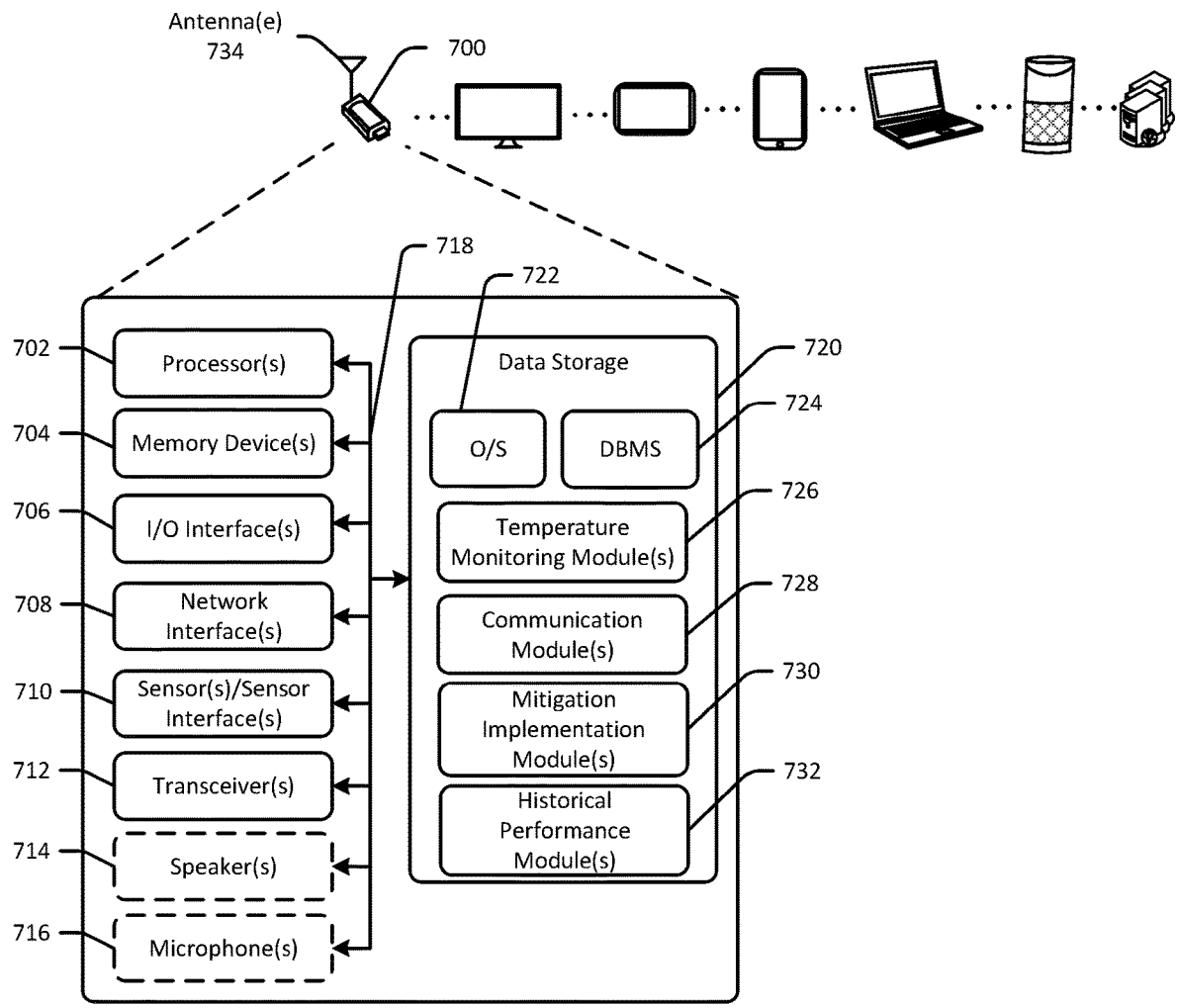
FIG. 7 is a schematic block diagram of an illustrative device in accordance with one or more example embodiments of the disclosure.

FIG. 7 is a schematic block diagram of an illustrative electronic device 700 in accordance with one or more example embodiments of the disclosure. The electronic device 700 may include any suitable computing device capable of receiving data and/or streaming content including, but not limited to, a content streaming device, a television, a mobile device such as a smartphone, tablet, e-reader, wearable device, or the like; a desktop computer; a laptop computer; a content streaming device; a set-top box; or the like. The electronic device 700 may correspond to an illustrative device configuration for the devices of FIGS. 1-6.

The electronic device 700 may be configured to communicate via one or more networks with one or more servers, televisions or other displays, user devices, or the like. In some embodiments, a single content streaming device or single group of streaming device and/or servers may be configured to perform more than one type of thermal increase mitigation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The electronic device 700 may further include one or more buses 718 that functionally couple various components of the electronic device 700. The electronic device 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the electronic device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the electronic device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more temperature monitoring module(s) 726, one or more communication module(s) 728, one or more mitigation implementation module(s) 730, and/or one or more historical performance module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the electronic device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, historical thermal data, network connection data, performance changes due to mitigation techniques, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the electronic device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the temperature monitoring module(s) 726 may include computer-executable instructions, code, or the like that responsive to execution by one or more of the processor(s) 702 may perform functions including, but not limited to, determining temperatures of one or more components of an electronic device, such as processor temperature, housing temperature, cavity temperature, chip temperature, and the like, monitoring device temperature(s), determining temperature thresholds, and so forth.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote servers, streaming data, sending or receiving notifications or alerts, communicating with cache memory data, and the like.

The mitigation implementation module(s) 730 may include computer-executable instructions, code, or the like that responsive to execution by one or more of the processor(s) 702 may perform functions including, but not limited to, determining mitigation techniques to implement, implementing mitigation techniques, causing the electronic device to implement certain actions, selecting appropriate mitigation techniques, and the like.

The historical performance module(s) 732 may include computer-executable instructions, code, or the like that responsive to execution by one or more of the processor(s) 702 may perform functions including, but not limited to, storing data related to changes in temperature associated with various mitigation techniques, determining mitigation technique effectiveness, and the like.

Referring now to other illustrative components depicted as being stored in the data storage 720, the O/S 722 may be loaded from the data storage 720 into the memory 704 and may provide an interface between other application software executing on the electronic device 700 and hardware resources of the electronic device 700. More specifically, the O/S 722 may include a set of computer-executable instructions for managing hardware resources of the electronic device 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device 700 is a mobile device, the DBMS 724 may be any suitable light-weight DBMS optimized for performance on a mobile device.

Referring now to other illustrative components of the electronic device 700, the input/output (I/O) interface(s) 706 may facilitate the receipt of input information by the electronic device 700 from one or more I/O devices as well as the output of information from the electronic device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The electronic device 700 may further include one or more network interface(s) 708 via which the electronic device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the electronic device 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the electronic device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device 700 may include alternate and/or additional hardware, software, or firmware components beyond those described or depicted without departing from the scope of the disclosure. More particularly, it should be appreciated that software, firmware, or hardware components depicted as forming part of the electronic device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising:
   memory that stores computer-executable instructions; and
   at least one processor configured to access the memory and execute the computer-executable instructions to:
   determine that the device is operating in a first mode;
   determine that a temperature of the device is greater than or equal to a first threshold temperature;

send a notification to an access point indicating that the device will enter a first state;

cause the device to enter the first state;

determine that a first length of time has elapsed since the device entered the first state;

determine that the temperature of the device is greater than or equal to a second threshold temperature;

cause the device to operate in a second mode different from the first mode;

determine that the temperature is equal to or less than a third threshold temperature; and cause the first mode to be reactivated.

2. The device of claim 1, wherein the at least one processor is further configured to execute the computer-executable instructions to:

cancel a scheduled sleep state event after the first mode is reactivated.

3. The device of claim 1, wherein the first mode uses more bandwidth than the second mode.

4. The device of claim 1, further comprising:

cause the device to enter a sleep state or a low power state.

5. The device of claim 1, wherein the at least one processor is further configured to execute the computer-executable instructions to:

receive data during a second length of time;

send a request to the access point indicative of a duration to reserve a channel at the access point for a duration of time;

receive an approval notification for the request; and cause the device to enter a second state for the duration after the second length of time.

6. The device of claim 1, wherein the device is a media streaming device coupled to a display.

7. A device comprising:

at least one memory that stores computer-executable instructions; and at least one processor configured to access the at least one memory and execute the computer-executable instructions to:

determine that a temperature of the device is greater than or equal to a first threshold temperature;

send a notification to an access point, communicatively coupled to the device, indicating that the device will enter a sleep state for a first length of time;

determine that first data was received during the first length of time;

determine that second data was received during the first length of time; and send a medium reservation request to the access point.

8. The device of claim 7, wherein the at least one processor is further configured to execute the computer-executable instructions to:

determine that the temperature is equal to or less than a second threshold temperature; and cause the device to transition to a second mode that is different from a first mode.

9. The device of claim 8, wherein the at least one processor is further configured to execute the computer-executable instructions to:

cancel a scheduled sleep state event after the second mode is activated.

10. The device of claim 8, wherein the first mode uses more bandwidth than the second mode.

11. The device of claim 7, wherein the at least one processor is further configured to execute the computer-executable instructions to:

determine an amount of medium utilization at the access point that is attributable to the device; and determine the first length of time using the amount of medium utilization.

12. The device of claim 7, wherein the at least one processor is further configured to execute the computer-executable instructions to:

receive an approval notification for the medium reservation request; and cause the device to enter the sleep state.

13. The device of claim 7, wherein the at least one processor is further configured to execute the computer-executable instructions to:

determine that first data was received during the first length of time; and determine that second data was received.

14. A method comprising:

determining, by a device, that the device is operating in a first mode;

determining that a temperature of the device is greater than or equal to a first threshold temperature;

sending a notification to an access point indicating that the device will enter a first state;

causing the device to enter the first state;

determining that a first length of time has elapsed since the device entered the first state;

determining that the temperature of the device is greater than or equal to a second threshold temperature;

causing the device to operate in a second mode different from the first mode;

determining that the temperature is equal to or less than a third threshold temperature; and causing the first mode to be reactivated.

15. The method of claim 14, further comprising:

canceling a scheduled sleep state event after the first mode is reactivated.

16. The method of claim 14, wherein the first mode uses more bandwidth than the second mode.

17. The method of claim 14, further comprising:

causing the device to enter a sleep state or a low power state.

18. The method of claim 14, further comprising:

receiving data during a second length of time;

sending a request to the access point indicative of a duration to reserve a channel at the access point for a duration of time;

receiving an approval notification for the request; and causing the device to enter a second state for the duration after the second length of time.

19. The method of claim 14, wherein the device is a media streaming device physically coupled to a display.

20. The method of claim 14, wherein the device is a media streaming device wirelessly coupled to a display.

* * * * *